United States Patent
Löh et al.

(10) Patent No.: US 11,994,300 B2
(45) Date of Patent: May 28, 2024

(54) PULL-OUT GUIDE AND MICROWAVE COOKING APPLIANCE OR INDUSTRIAL OVEN HAVING A PULL-OUT GUIDE

(71) Applicant: PAUL HETTICH GMBH & CO. KG, Kirchlengern (DE)

(72) Inventors: Andreas Löh, Bückeburg (DE); Johann-Sebastian Lessmann, Kirchlengern (DE); Johannes Tiwisina, Borgholzhausen (DE); Sergej Maier, Melle (DE); Johann Braun, Hiddenhausen (DE)

(73) Assignee: Paul Hettich GmbH & Co. KG, Kirchlengern (DE)

( * ) Notice: Subject to any disclaimer, the term of this patent is extended or adjusted under 35 U.S.C. 154(b) by 895 days.

(21) Appl. No.: 16/982,771

(22) PCT Filed: Mar. 18, 2019

(86) PCT No.: PCT/EP2019/056733
§ 371 (c)(1),
(2) Date: Sep. 21, 2020

(87) PCT Pub. No.: WO2019/179956
PCT Pub. Date: Sep. 26, 2019

(65) Prior Publication Data
US 2021/0010680 A1 Jan. 14, 2021

(30) Foreign Application Priority Data
Mar. 22, 2018 (DE) .................... 10 2018 106 787.9

(51) Int. Cl.
*H05B 6/64* (2006.01)
*F24C 15/16* (2006.01)
*A47J 36/02* (2006.01)

(52) U.S. Cl.
CPC ......... *F24C 15/168* (2013.01); *H05B 6/6408* (2013.01); *A47J 36/027* (2013.01)

(58) Field of Classification Search
CPC ........ G16B 20/00; G16B 20/20; G16B 20/40; G16B 30/00; A47J 36/027; A47B 88/04; F24C 15/168; H05B 6/6408; B29C 67/00
(Continued)

(56) References Cited

U.S. PATENT DOCUMENTS

| 2015/0159415 A1 | 6/2015 | Rehage et al. |
| 2015/0252843 A1 | 9/2015 | Bachor et al. |

(Continued)

FOREIGN PATENT DOCUMENTS

| DE | 3834721 A1 | 4/1990 |
| DE | 4142346 A1 | 6/1993 |

(Continued)

OTHER PUBLICATIONS

Office Action dated Jul. 30, 2021 in related/corresponding EP Application No. 19 713 385.3.
(Continued)

*Primary Examiner* — Quang T Van
(74) *Attorney, Agent, or Firm* — PATENT PORTFOLIO BUILDERS PLLC

(57) ABSTRACT

A pull-out guide for a microwave cooking appliance or an industrial oven includes a body rail and a running rail that is movable relative thereto, for depositing a carrier. The pull-out guide includes an electrical contact for electrically contacting the running rail with the body rail.

14 Claims, 10 Drawing Sheets

Figure 1B:
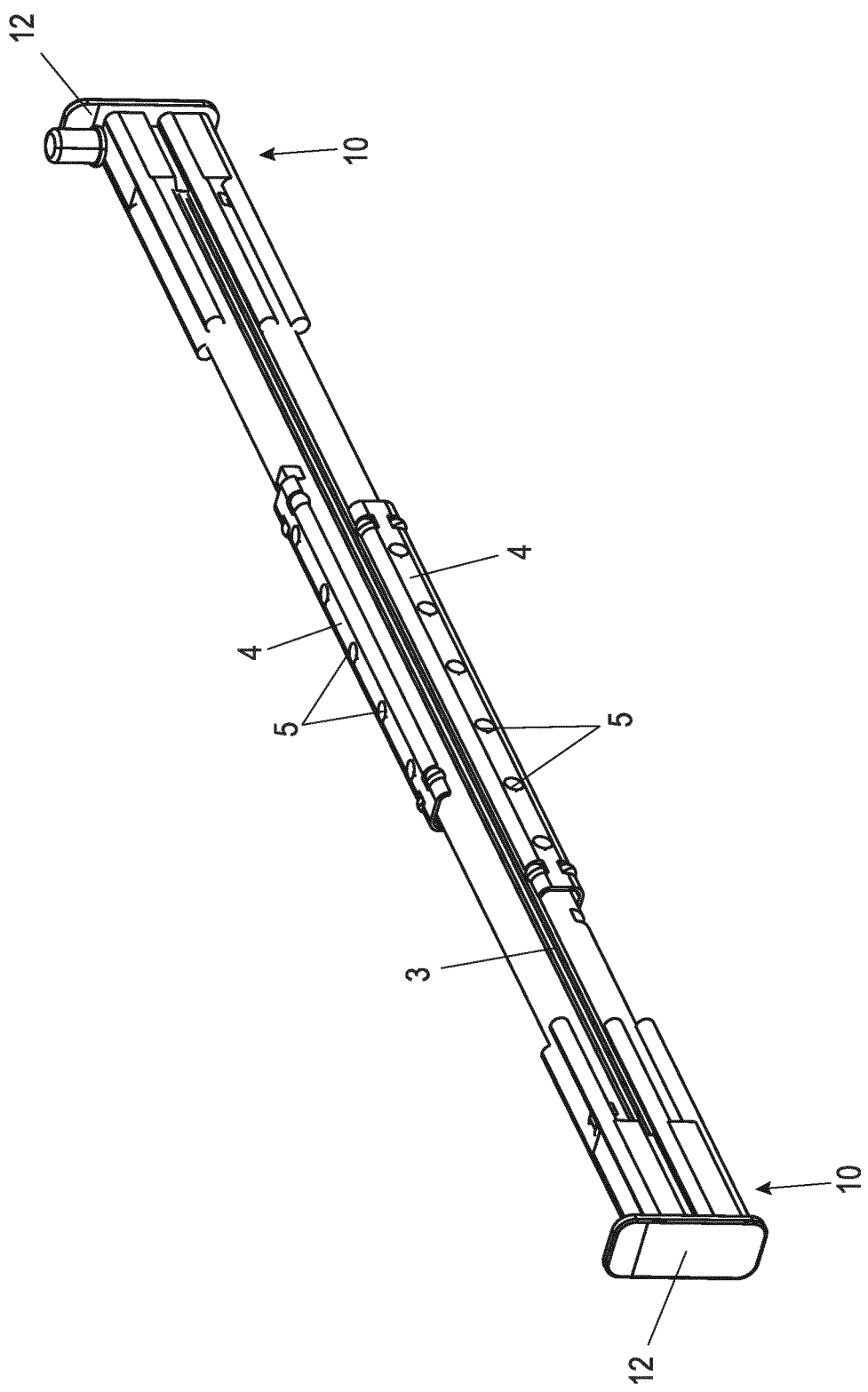

(58) Field of Classification Search
USPC .................. 219/762, 763, 752, 753, 756
See application file for complete search history.

(56) References Cited

U.S. PATENT DOCUMENTS

| | | | |
|---|---|---|---|
| 2017/0122572 A1 | 5/2017 | Dinkel et al. | |
| 2018/0055224 A1* | 3/2018 | Mason | A47B 88/487 |
| 2019/0150234 A1 | 5/2019 | Heffel et al. | |
| 2020/0137841 A1 | 4/2020 | Lessmann et al. | |
| 2021/0010680 A1* | 1/2021 | Löh | F24C 15/168 |

FOREIGN PATENT DOCUMENTS

| | | |
|---|---|---|
| DE | 202008006302 U1 | 9/2009 |
| DE | 102011054726 A1 | 4/2013 |
| DE | 102012100454 A1 | 7/2013 |
| DE | 102013102948 A1 | 6/2014 |
| DE | 102013102949 A1 | 6/2014 |
| DE | 102013225405 A1 | 6/2015 |
| DE | 102017106104 A1 | 9/2018 |
| EP | 3484247 A1 | 5/2019 |
| JP | H0936557 A | 2/1997 |
| JP | 2009082592 A | 4/2009 |
| JP | 2009293846 A | 12/2009 |
| WO | 2016012183 A1 | 1/2016 |

OTHER PUBLICATIONS

International Search Report dated Jun. 5, 2019 in related/corresponding International Application No. PCT/EP2019/056733.
Search Report created on Dec. 10, 2018 in related/corresponding DE Application No. 10 2018 106 787.9.
Written Opinion mailed Jun. 5, 2019 in related/corresponding International Application No. PCT/EP2019/056733.
Office Action dated Jan. 17, 2023 in related/corresponding JP Application No. 2020-550799.

* cited by examiner

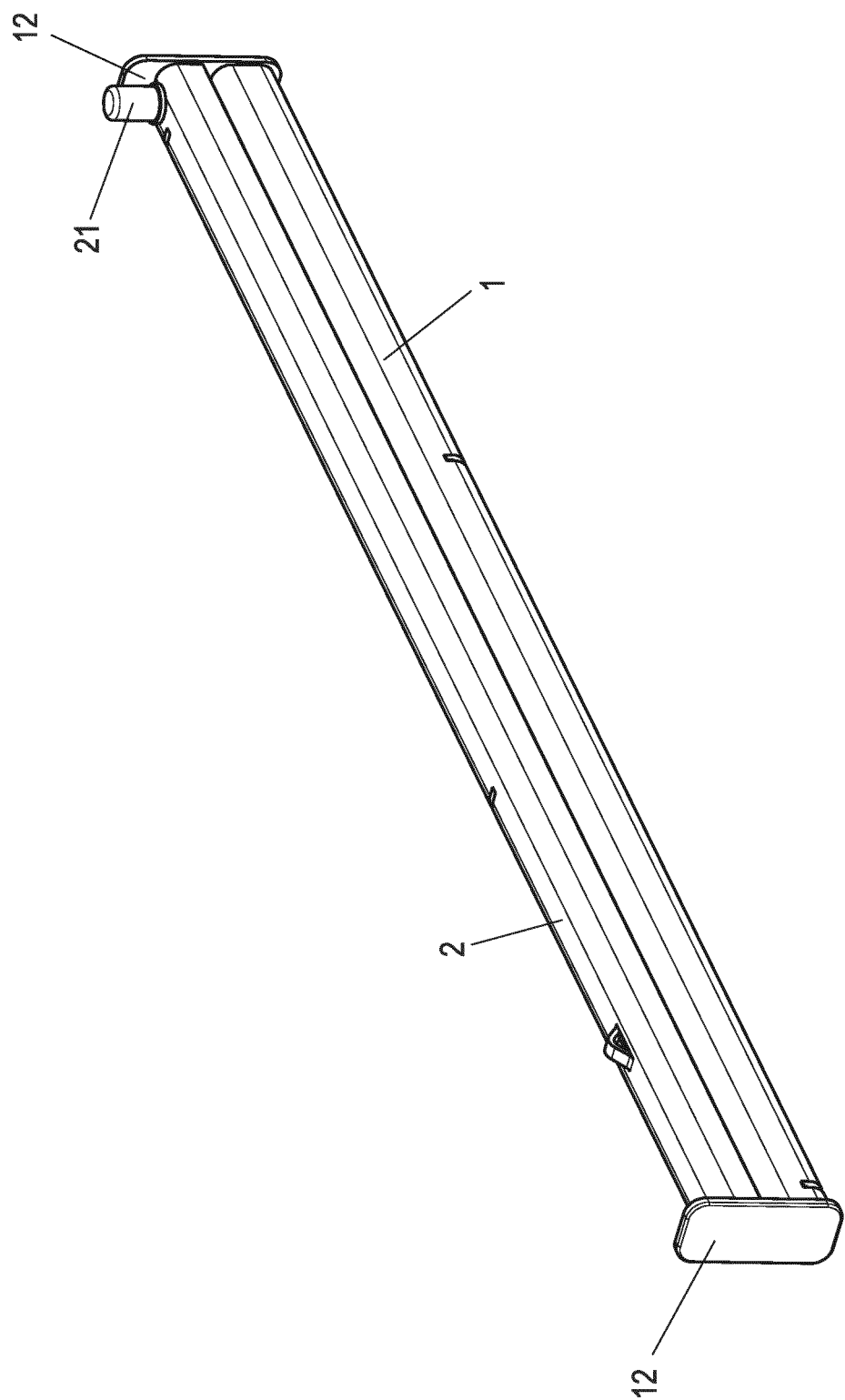

PULL-OUT GUIDE AND MICROWAVE COOKING APPLIANCE OR INDUSTRIAL OVEN HAVING A PULL-OUT GUIDE

BACKGROUND AND SUMMARY OF THE INVENTION

Exemplary embodiments of the invention relate to a pull-out guide for a microwave cooking appliance or an industrial oven, comprising a body rail and a running rail that is movable relative thereto for depositing a carrier, in particular a food carrier. Exemplary embodiments of the invention further relate to a microwave cooking appliance or an industrial oven with such a pull-out guide.

In cooking appliances such as ovens, pull-out guides have become implemented with which a food carrier, e.g., a baking tray, can be conveniently pulled out of a cooking chamber of the appliance in order to be able to remove it more easily or to take a cooking sample without any risk of the food carrier tilting.

In cooking appliances that heat or cook food exclusively or alternatively to or in combination with other cooking methods via microwave radiation, all components located in the cooking chamber are subject to specific restrictions due to microwave radiation. Built-in components in the cooking chamber, including pull-out guides, must be prevented from absorbing energy from microwave radiation and thereby heating up or dissipating the absorbed energy in an undesirable way. On the one hand, heating is undesirable from an energy point of view, and on the other hand it can lead to damage to the pull-out guide or other components in the cooking chamber, or even to a fire hazard. There is also the risk of plasma discharges forming, which are also undesirable from an energy point of view and also with regard to a destructive effect. A similar problem exists with industrial ovens that use microwave radiation for heating purposes.

DE 4142346 A1 discloses a pull-out guide for a microwave cooking appliance, in which the running rail of the pull-out guide is surrounded by a shielding rail with a closed hollow cross-sectional profile or in which the running rail itself is designed as a shielding rail. The shielding rail shields the actual pull-out guide in such a way that the internal components of the pull-out guide are inaccessible to microwave radiation.

A disadvantage of the design is that the configuration with a closed hollow cross-section profile does not allow direct support of the pull-out rail in the area in which the running rail moves. Accordingly, the pull-out rail can only be fixed in a rear end area and must be guided in a front area, for example by a guide roller rotatably mounted on a side wall of the cooking chamber. Such a guide roller results in an additional space requirement for the pull-out guide and does not allow a design as a full-extension/over-extension unit. In addition, cleaning such an exposed guide roller is problematic.

Therefore, exemplary embodiments of the present invention are directed to a pull-out guide that can be used in a cooking or heating chamber with microwave radiation without the use of a closed hollow cross-sectional profile and without additional external guide elements. Exemplary embodiments are also directed to a microwave cooking appliance and an industrial oven with such a pull-out guide.

A pull-out guide of the type mentioned above is characterized in that means for electrically contacting between the running rail and the body rail are provided.

In this way, it is prevented that irradiation of the pull-out guide with microwaves leads to the build-up of charge on one of the rails of the pull-out guide relative to another one of the rails, which could optionally result in a (plasma) discharge between the rails.

If it is assumed that the pull-out guide is also mounted in an electrically conductive manner, the body rail is electrically connected to the side walls of the cooking chamber, so that the rails as a whole and thus essentially all metal components of the pull-out guide that are accessible from the outside are at the same potential as the side walls of the cooking chamber. This also prevents discharges from the pull-out guide to the side walls. In addition, the side walls are also often grounded. The equipotential bonding means that the pull-out guide is also grounded accordingly. The microwaves preferably form wave nodes on grounded components, which is why essentially no energy is transmitted by the microwaves to the grounded components.

In an advantageous design, the pull-out guide is designed as a full-extension pull-out guide and features a middle rail that can be moved relative to the body rail and the running rail. An attached (food) carrier can be moved out of an interior of the microwave oven by the full-extension drawer to such an extent that the carrier is particularly easily accessible. Preferably, the means for electrical contact also connect the running rail and/or the body rail electrically with the middle rail, so that the middle rail is also protected from being charged by microwave irradiation.

In a further advantageous design of the pull-out guide, the means for electrical contact between the body rail, the running rail and, if necessary, the middle rail establish an electrical connection at least in one retracted position of the pull-out guide. Alternatively, it is conceivable to design the means for electrical contact in such a way that there is an electrical connection between the rails over the entire pull-out area. However, since microwaves are generally only generated when the interior is closed by a door, contacting is particularly relevant in the retracted position of the pull-out guide.

In a further advantageous design of the pull-out guide, the means for electrical contacting comprise at least one end plug that is inserted into an end region of the body rail and/or the running rail and which has at least one contact element projecting into the body rail and/or the running rail and contacts this rail. An end plug, which closes the rails at the end face, is generally provided in pull-out guides. It forms a stop and prevents excessive retraction of the rails. Often it also carries a cover on the front side. With the design mentioned above, contact elements are arranged on the end plug to ensure the electrical connection of the rails, i.e., the body and running rails and, if present, also the middle rail, to each other. Without any major design changes, the electrical contacts are thus integrated into the generally known configuration of the pull-out guide.

The at least one contact element can be designed as a contact rod, for example. Alternatively, it can also be designed as a contact spring. The at least one contact element can preferably be designed in such a way that it holds the pull-out guide in a retracted position by frictional and/or positive locking. The contact element is thus advantageously used to implement a locking function, also known as guard locking, which is frequently required in microwave ovens. This is used, for example, to maintain a distance between, for example, the door of the microwave oven and the front cover, thus additionally preventing (spark) breakdowns between these elements. In alternative designs, however, it is also possible to implement guard locking using separate components.

In another advantageous design of the pull-out guide, the means for electrical contacting include at least one contact roller. In one design, the at least one contact roller can be arranged rotatably on the middle rail and contact the body rail and/or the running rail. Preferably, at least two contact rollers are arranged one behind the other on the middle rail in a longitudinal direction of the middle rail for reliable contacting. To compensate for height tolerances and to achieve an even better electrical contact, the at least one contact roller can be mounted with springs and/or play. If the pull-out guide is designed as a full extension drawer, the contact rollers also represent contact elements that can be easily integrated into existing pull-out guide design concepts.

In a further design, the at least one contact roller can be mounted rotatably on the body rail and/or the running rail and contact the other of the rails. For example, the at least one contact roller can be arranged in such a way that it enters the respective other rail when the pull-out guide is retracted and thus makes contact between the two rails at least in the retracted state of the pull-out guide.

In this case, it may be additionally provided for at least one ramp to be arranged in the area of the other rail into which the at least one contact roller enters. Especially in combination with a spring-loaded contact roller, a guard locking and/or self-retracting function and/or a stop function can be realized.

The at least one contact element and/or the at least one contact roller can thereby have an electrically conductive material, in particular a metal and/or graphite and/or an electrically conductive plastic. Preferred metals are copper, brass or bronze because of their good conductivity. The electrically conductive materials can be, for example, polyketone (POK), polypropylene (PP), thermoplastic polyurethane (TPU) and/or polyetheretherketone (PEEK), which is made electrically conductive by appropriate additives, usually carbon particles such as carbon black.

The contact element and/or the at least one contact roller may be made entirely or partially of the above materials. It is also possible that a core, which may consist of an electrically conductive or a non-conductive material, is surrounded by an electrically conductive and compliant material. The electrically conductive and compliant material is, for example, a knitted or crocheted fabric of conductive threads or includes conductive brushes or bristles.

A microwave cooking appliance or an industrial oven according to the invention has at least one such pull-out guide. This results in the advantages mentioned in connection with the pull-out guide.

BRIEF DESCRIPTION OF THE DRAWING FIGURES

Figure 2A:
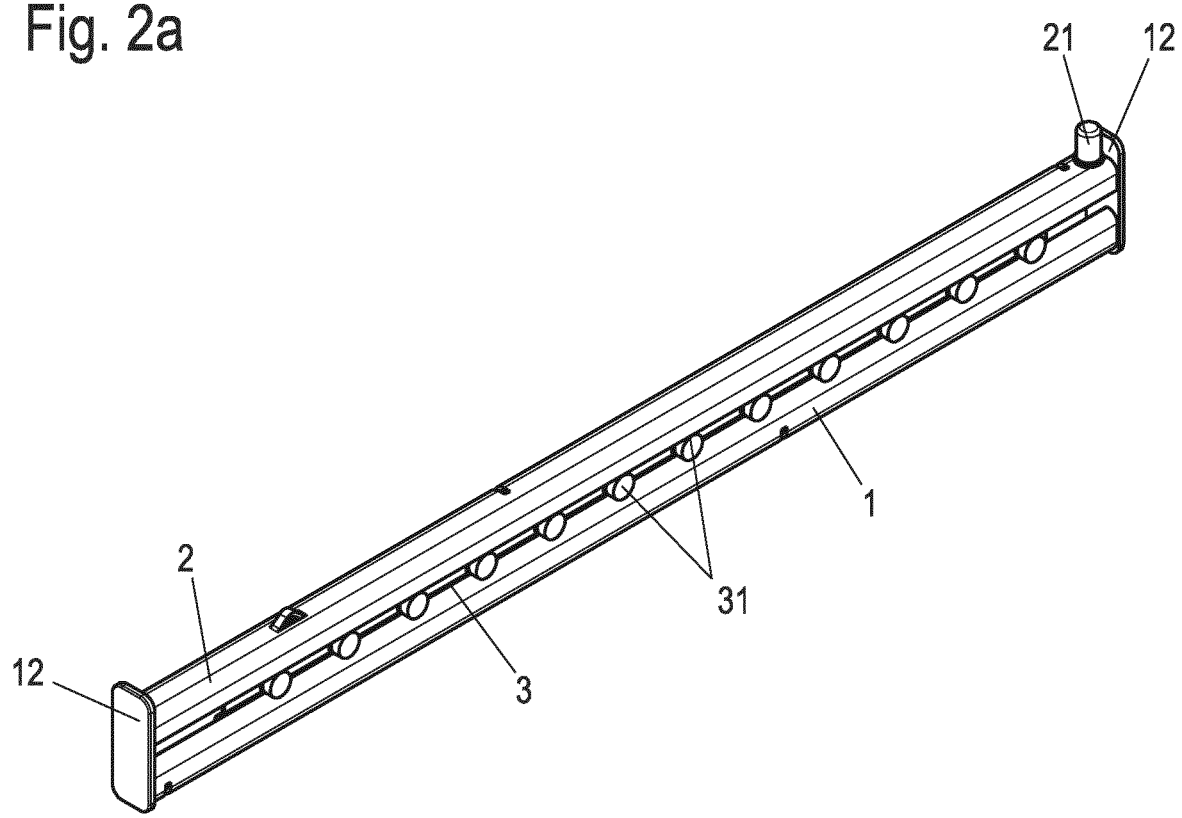
Figure 2B:
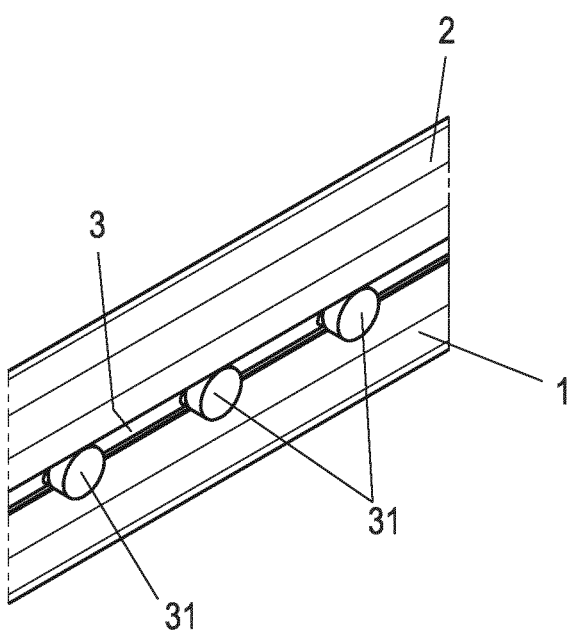
Figure 2C:
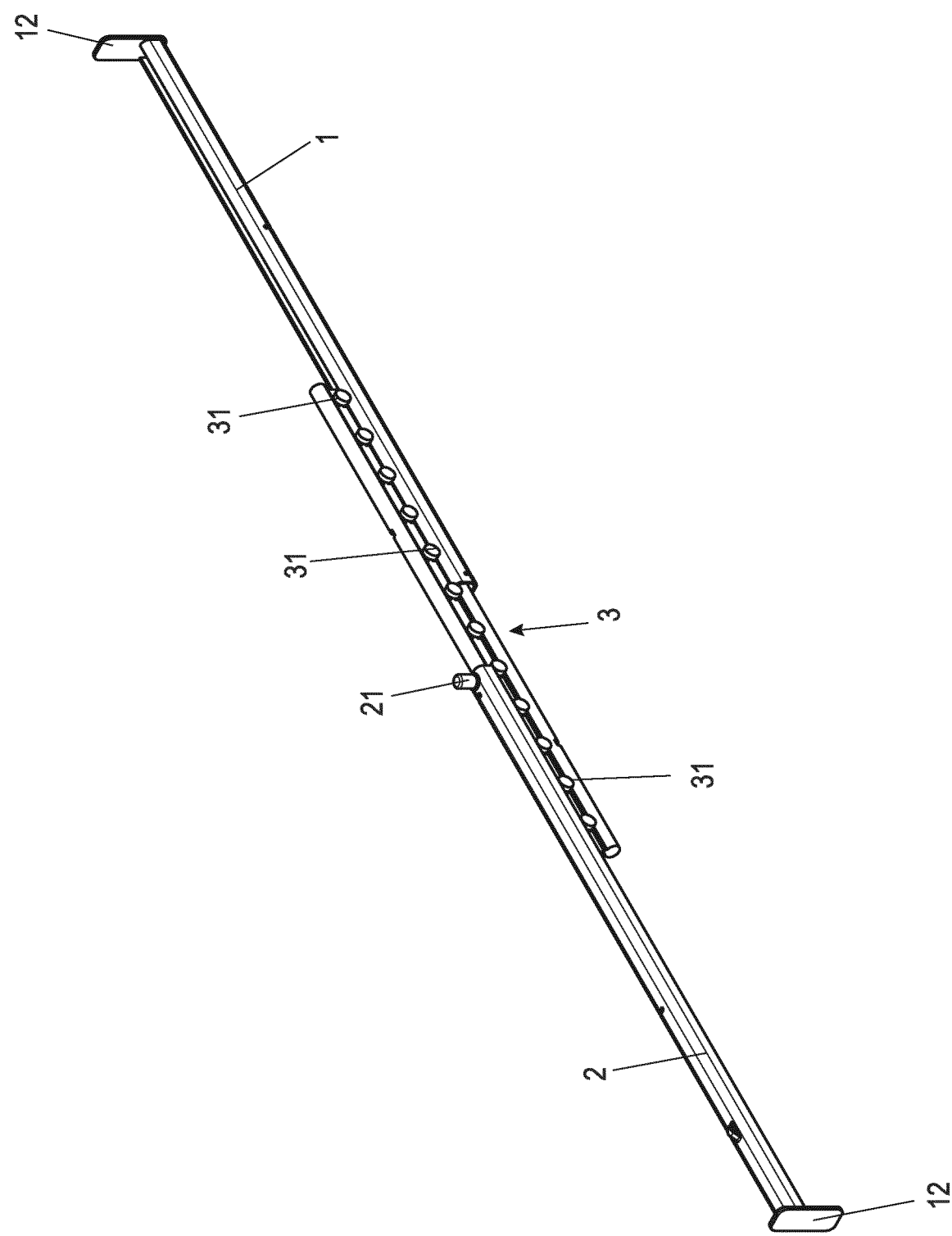
Figure 3A:
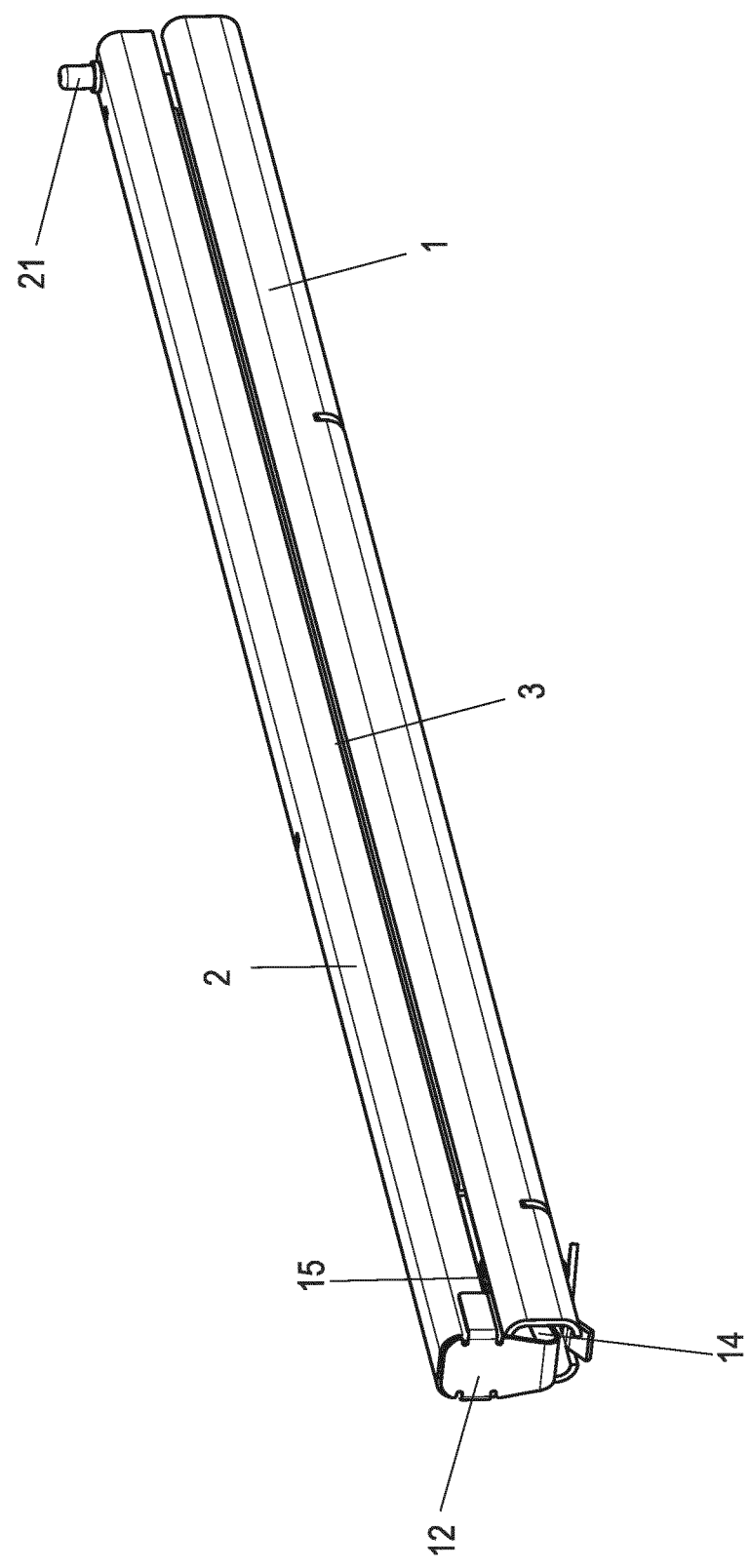
Figure 3B:
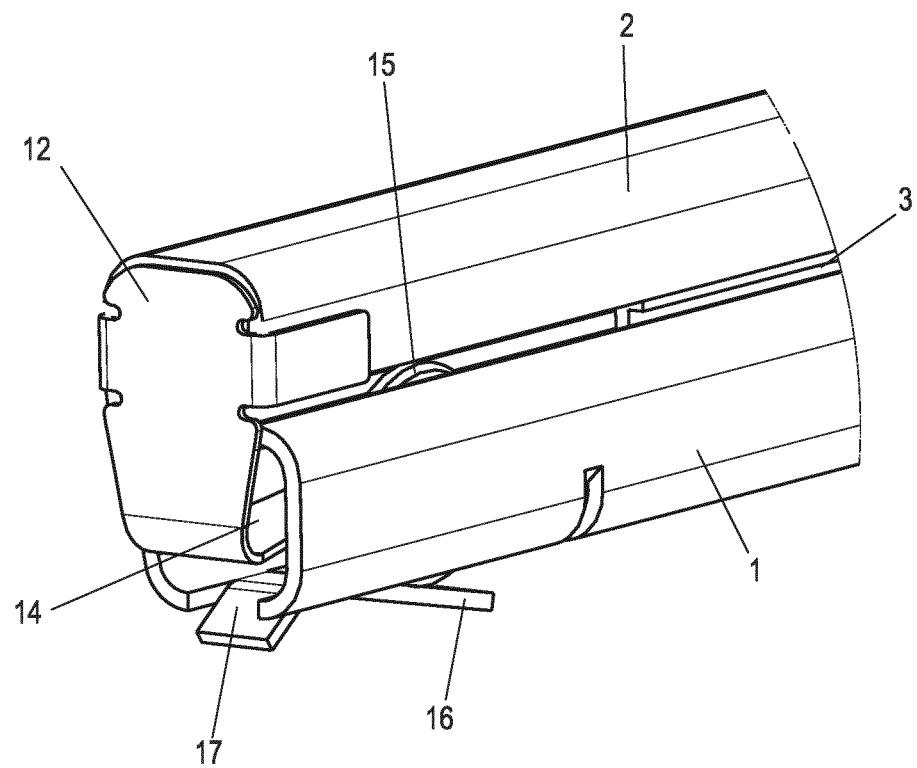
Figure 3C:
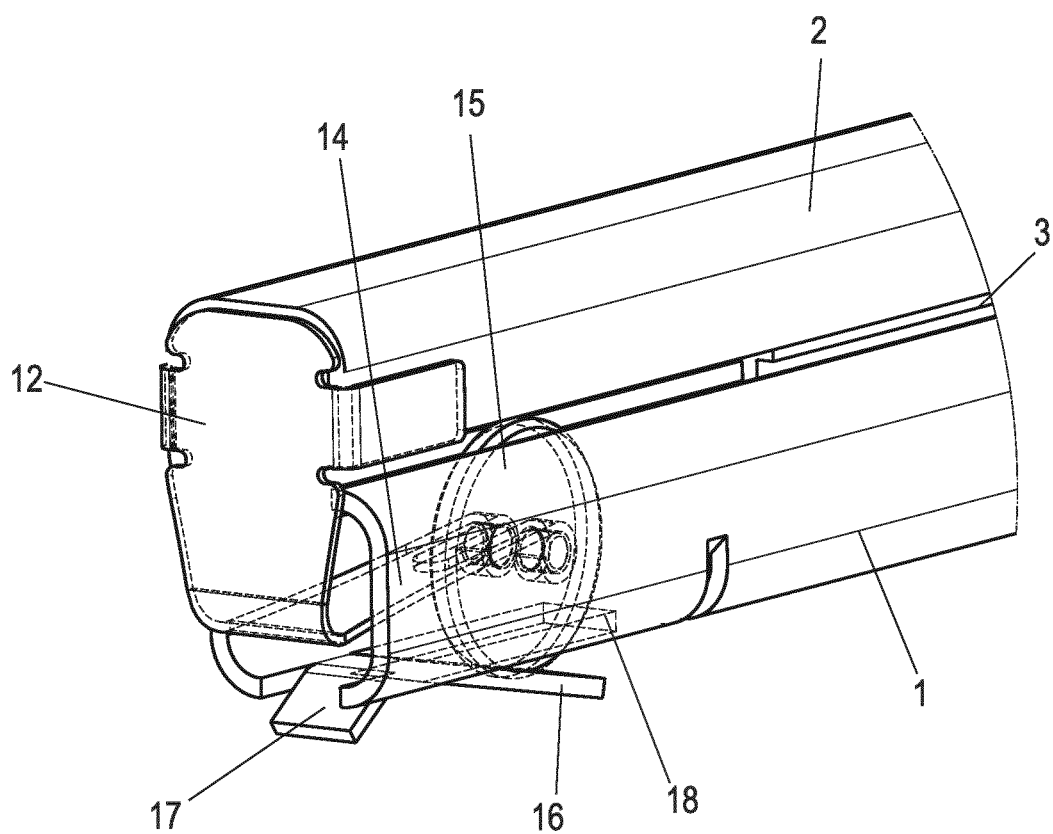
Figure 4:
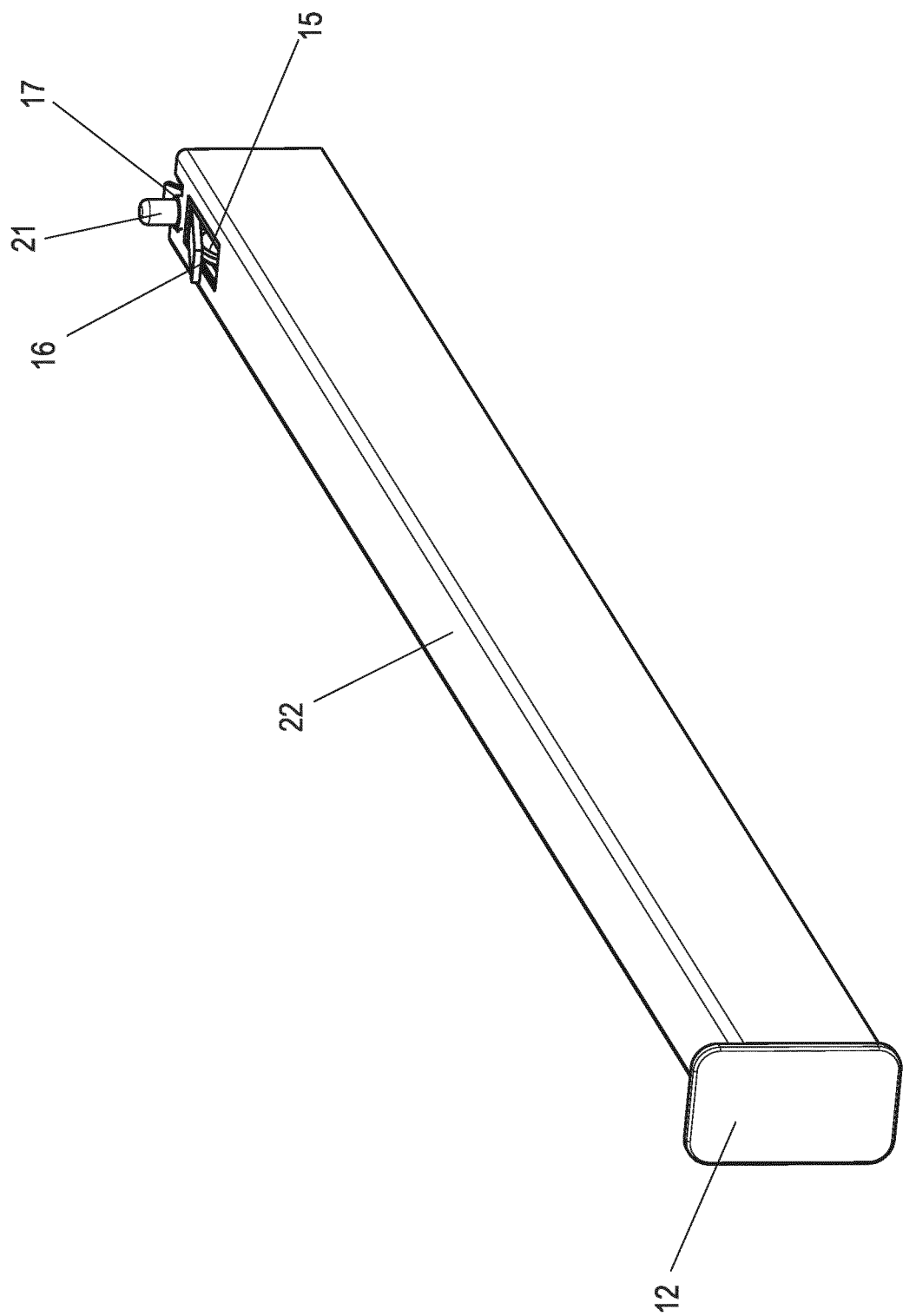

The invention is explained in more detail below with the aid of embodiment examples shown in the drawings, wherein:

FIGS. 1a-d show an overall view of a first embodiment example of a pull-out guide in various isometric representations;

FIGS. 2a-c show a further embodiment example of a pull-out guide in various isometric representations;

FIGS. 3a-c show a further embodiment example of a pull-out guide in various isometric representations; and FIG. 4 shows a further embodiment example of a pull-out guide in an isometric representation.

DETAILED DESCRIPTION

FIGS. 1a to 1d show a first example of a pull-out guide for a microwave oven.

The microwave cooking device is understood to be a microwave oven or a so-called combination device that provides a thermal cooking function as an alternative or in addition to a microwave cooking function. As a rule, at least two such pull-out guides are used on the left and right in a cooking chamber at the same height in order to be able to place a food carrier, e.g., a baking tray or a grid, on top of it and guide it horizontally out of the cooking chamber. Optionally, such pull-out guides can be arranged on several levels one above the other. However, it is also conceivable to use a pull-out guide according to the invention in an industrial oven, e.g., for heating or cross-linking plastics.

Figure 1C:
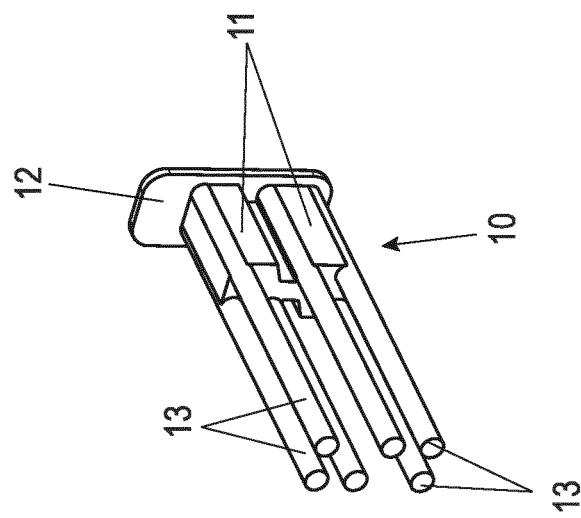
Figure 1C:
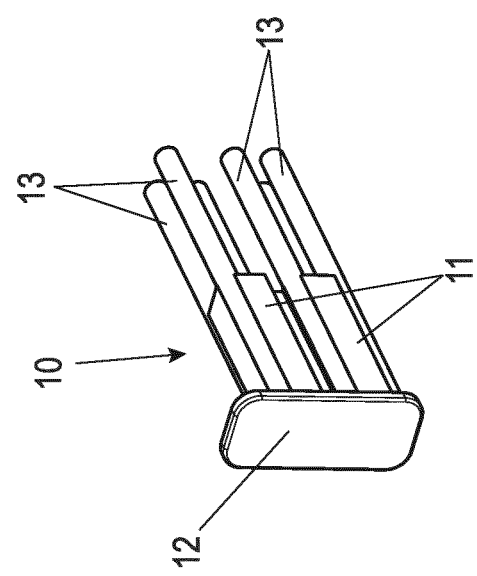
Figure 1D:
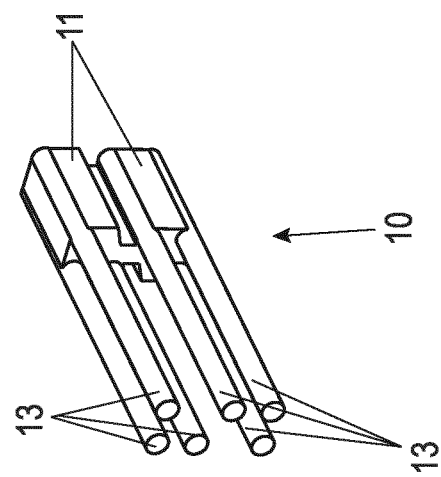
Figure 1D:
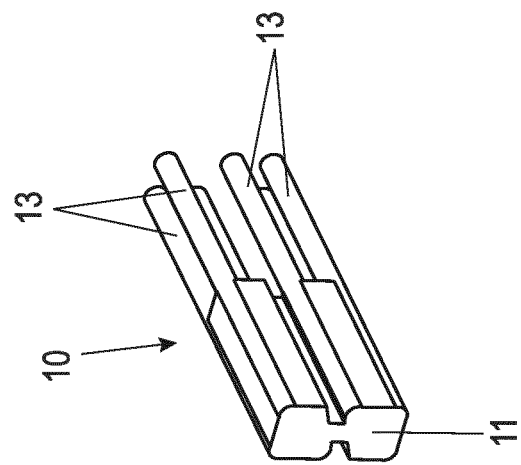

The pull-out guide is shown in FIG. 1a in an isometric overall view in a retracted state. The representations in FIGS. 1b to 1d are basically analogous with regard to the viewing angle. However, more components of the pull-out guide are successively removed in order to gain an insight into the internal structure of the pull-out guide.

As shown in FIG. 1a, the pull-out guide comprises a body rail 1 and a running rail 2, which is arranged above the body rail 1 and is slidably guided relative to it. When installed in a microwave oven, the body rail 1 is mounted on one side of a cooking chamber by means of mounting hardware not visible here, e.g., mounting brackets. A food carrier is placed on the running rail 2, which is fixed, for example, by means of the bolt 21 visible in FIG. 1a, which is connected to the running rail 2. In this way, the food carrier can be pulled out of the cooking chamber with the help of the pull-out guide when the door of the microwave oven is open and, optionally, can also be removed from the pull-out guide. At the front of each unit there are front covers 12, one of which, shown on the right in the figures, is fixed to the body rail 1, whereas the one shown on the left in the figures is fixed to the running rail 2 and moves with the running rail 2.

In FIG. 1b the running rail 2 and the body rail 1 are removed. In this figure it can be seen that the pull-out guide is designed as a full-extension drawer that has a middle rail 3 that can be moved in relation to both the body rail 1 and the running rail 2. The body and running rails 1, 2 are each designed as an unclosed square profile, which has a partially open side. These partially opened sides of the profiles of the body rail 1 and the running rail 2 face each other, so that the middle rail 3 can extend to the inside of the body rail 1 and the running rail 2 respectively. The middle rail 3 is displaceably guided in the body rail 1 and the running rail 2 by at least one rolling element cage 4, in which several rolling elements 5 are held.

According to the invention, the illustrated pull-out guide is suitable for use in a microwave cooking appliance because means for electrical contact between the rails are provided. If it is assumed that the pull-out guide is also mounted in an electrically conductive manner, body rail 1 is electrically connected to the side walls of the cooking chamber, which are usually also grounded, so that all rails and thus essentially all metal components of the pull-out guide accessible from the outside are equipotentially balanced.

This prevents irradiation of the pull-out guide with microwaves leading to a build-up of charge on one component of the pull-out guide, which may lead to a (plasma) discharge from this component to another component. A charge could also endanger a user who touches the pull-out guide after opening the microwave oven door. Grounding can also cause the microwaves to form wave nodes on the grounded components and essentially no energy is transmitted by the microwaves to the grounded components.

In the embodiment example in FIGS. 1a-1d, an end plug 10 is fitted on each side of the pull-out guide as a means of making electrical contact between the body, middle and running rails 1, 2, 3. These end plugs 10 are shown separately in FIG. 1c and in FIG. 1d without the already mentioned front covers 12.

The end plugs 10 each have a base body 11, which carries the front cover 12 and which is provided with recesses into which contact rods 13 are inserted. The base body can also be designed in one piece with the front cover.

The base bodies 11 are shaped in such a way that their outer profile is pushed into the end areas of the body or running rails 1, 2 as accurately as possible. One of the rails is connected in each case to one of the base bodies 11, in particular by (spot) welding or stamping. This ensures that one end plug 10 is firmly connected to the body rail 1 and the other end plug 10 is firmly connected to the running rail 2.

Starting from the base bodies 11, the contact rods 13 protrude into the body rail 1 or the running rail 2 and contact the body rail 1, the running rail 2 on the inside of their respective profile and the middle rail 3 on their outside. In the example shown, there are six contact rods 13 on each of the base bodies, which can be divided into two groups of three contact rods 13 each, an upper and a lower group. The contact rods 13 of the upper group provide a connection between the running rail 2 and the middle rail 3 and the contact rods 13 of the lower group connect the middle rail 3 to the body rail 1.

The contact rods 13 are advantageously made of a material with good electrical conductivity, for example a metal, preferably copper, bronze, brass or even steel. Other materials with good electrical conductivity can also be used, for example graphite. It is also possible to use conductive plastics for the contact rods 13, e.g., conductive POI, PP, TPU and/or PEEK.

The contact rods 13 can be made exclusively of the materials mentioned above, so that they contact the rails with the surface of these materials. However, it is also conceivable to provide the contact rods 13 with a conductive lubricant or a conductive coating, which can lead to a more extensive contact compared to the materials mentioned. It is also conceivable to make a surface of the contact rods 13 mechanically flexible by means of a knitted fabric or incorporated bristles or brushes, which will result in good contact even if there are tolerances in the lateral or vertical positioning of the rails relative to each other. It is also conceivable to manufacture the contact rods together with the base body as an integral element, which comprises either a material mix (multi-component injection molding) or subsequently coated contact rods.

For pull-out guides in microwave ovens, a so-called guard locking function is also often desired, in which the guide is easily fixed in the pushed-in and/or fully extended position. This type of guard locking is advantageously achieved by the end plugs 10 and the mechanical contact of the body, middle and running rails 1, 2, 3 with the contact rods 13, e.g., by a frictional connection or to protect the material of the contact rods by an additional component, e.g., a locking spring inside or outside the pull-out guide.

Due to the design, the rails are only contacted by the contact rods 13 when the pull-out guide is retracted or almost retracted. Only in this state, however, is the pull-out guide exposed to microwaves, as opening the door of the microwave oven, which is a prerequisite for the pull-out guides to be extended, usually causes the microwave source to be switched off.

FIGS. 2a-2c show a second embodiment example of a pull-out guide according to the invention. FIG. 2a shows the pull-out guide in the same way as FIG. 1a in an isometric general view in the retracted state. FIG. 2b shows an enlarged section of the pull-out guide. Finally, FIG. 2c shows the pull-out guide in an isometric general view in an extended state.

In FIGS. 2a-2c, the same reference numerals indicate the same or equally effective elements as in FIGS. 1a-1d.

With regard to the basic structure, the pull-out guide of the second embodiment example is comparable to that of the first embodiment example. Again, the pull-out guide is designed as a full-extension drawer, wherein a body rail 1 is mounted so that it can move linearly relative to a middle rail 3 and the latter relative to a running rail 2. Bearing can again be carried out by rolling element cages with rolling elements which are not visible here.

The body rail 1 is mounted on a side wall in the cooking chamber of the microwave oven. A food carrier can be placed on the running rail 2 and is fixed in the same way as in the first embodiment example by means of the bolt 21 so that it can be removed. Front covers 12 cover the pull-out guides at the front, wherein one (in the figures the right-hand one) of the front covers 12 is attached to the body rail and the other (in the figures the left-hand one) of the front covers 12 is attached to the running rail 2. In the embodiment example shown, the front covers 12 can be fastened directly to the running rails or by means of plugs which are inserted in each case into one of the running rails.

In the second embodiment example, contact rollers 31 are rotatably mounted on the middle rail 3 as a means of contacting the body, middle and running rails 1, 3, 2 with each other. The contact rollers 31 are made of or have an electrically conductive material, wherein reference is made to the list of materials which is given in the first embodiment example in connection with the contact rods 13. In particular, a design directly from a solid, but possibly elastic material is also conceivable here, or a design with a solid (hard) core surrounded by a compressible material, for example a knitted or crocheted fabric or a bristle or brush edge or an electrically conductive plastic. This surrounding can refer in particular to a circumferential running surface of the contact rollers 31.

The contact rollers 31 are preferably attached to axles, which are not visible here and which protrude from the middle rail 3, wherein the attachment can also take place via a tiltable or spring bearing to enable height compensation of the contact rollers 31. In the case of a spring bearing of the contact rollers 31, it may preferably be provided that a first part of the contact rollers 31 presses in a spring-loaded manner against the body rail 1, whereas a further part of the contact rollers 31 presses in a spring-loaded manner against the running rail 2.

The majority of contact rollers 31 provide an electrical connection between body rail 1 and running rail 2, either directly or indirectly via middle rail 3.

In principle, a single contact roller 31 would be sufficient for contacting the rails with each other when the pull-out guide is closed. Preferably, however, at least two and especially preferably a plurality of contact rollers 31 are provided in order to achieve good and reliable contacting. In particular, contact points are provided at intervals of a few centimeters (cm). The microwaves used generally have a wavelength of about 12 cm. Charges caused by an antenna effect are effectively prevented if sections of the rails which are not in contact with each other are no longer than about a quarter of the wavelength of the microwaves, i.e., about 3 cm.

If the contact rollers 31 are arranged along essentially the entire longitudinal extension of the middle rail 3, contact between the rails is also ensured even when the pull-out guide is fully extended, as shown in FIG. 2c.

A guard locking mechanism can also be implemented in the second embodiment example in FIGS. 2a-2c. In this case, it is possible to implement the guard locking mechanism via the contact rollers 31, so that these are advantageous for both the electrical contacting and the guard locking. Guard locking can also be implemented, for example, by forming bulges along the running surfaces on which the contact rollers 31 roll on the body rail 1 or the running rail 2, e.g., in the form of indentations. The indentations are positioned in such a way that at least one of the contact rollers 31 is positioned in such an embossment in the closed (and optionally also additionally in the extended) state of the pull-out guide, whereby the pull-out guide is easily fixed in this position. In particular, the corresponding contact roller is spring-loaded in the direction of the bulge, which results in a slight locking function for this position.

In both of the embodiment examples shown, the front cover 12 can be coated or covered with an electrically non-conductive material, for example a ceramic material, in a further development. This electrically non-conductive material serves as a spacer between the running rail 2 and a rear wall of the cooking chamber and/or a door of the microwave oven. Even if high electrical potentials build up on the pull-out guide and/or door, spark discharges are avoided in this way. The above-mentioned guard locking can also be used to maintain a distance between, for example, the microwave oven door and the front cover 12, thus preventing (spark) discharges.

FIGS. 3a-3c shows a third embodiment example of a pull-out guide according to the invention. FIG. 3a shows the pull-out guide in a similar way to FIG. 1a in an isometric general view in a retracted state. FIG. 3b shows an enlarged front section of the pull-out guide. FIG. 3c shows the same section as FIG. 3b with partially transparent elements, allowing an insight into the internal structure of the pull-out guide.

In FIGS. 3a-3c, the same reference numerals indicate the same or similarly acting elements as in the previous figures. With regard to the basic construction, the pull-out guide of this third embodiment example is comparable with the ones shown above. The pull-out guide is also designed as a full-extension drawer, wherein a body rail 1 is mounted so that it can move relative to a middle rail 3 and the latter relative to a running rail 2. Bearing is carried out by rolling element cages with rolling elements which are not visible here.

If body rail 1 is mounted on a side wall in the cooking appliance, a food carrier is again placed on running rail 2 and is fixed by bolt 21 of running rail 2, as in the embodiment examples shown above.

In this embodiment example, at least one contact roller 15 is provided as a means of contact according to the invention, which is attached to the front cover 12 via a resilient section 14 and rotatably mounted. Like the contact rollers 31 of the second embodiment example, the contact roller 15 of this embodiment example is also made of or has an electrically conductive material. The contact roller 15 is electrically connected to the running rail 2 via its bearing and the resilient section 14 of the front cover 12. The front cover 12 including the resilient section 14 can, for example, be made from a metal sheet in a punching and bending process and connected to the running rail 2 by a spot-welded joint.

As shown in FIGS. 3a-3d, when the pull-out guide is closed, the contact roller 15 projects into the front area of the body rail 1 and makes contact with it at its lower, horizontal section under spring force. As the middle rail 3 does not normally extend over the entire length of the body rail 1 or the running rail 2, there is a free space in the front section of the body rail 1 shown in which the running roller 15 can retract. A comparable free space exists in a rear area of the running rail, in which the contact roller 15 could be arranged alternatively or additionally in the same way. An embodiment example with a contact roller 15 in the rear area is shown in FIG. 4.

In addition to the function of making electrical contact between the running rail 2 and the body rail 1, at least when the pull-out guide is retracted, the contact roller 15 in the embodiment example shown also serves to implement a guard locking and/or self-closing mechanism and a stop function.

For this purpose, the running surface, on which the contact roller 15 runs, is designed as a ramp 16 in the front area of the body rail 1. Due to the spring force with which the spring section 14 presses the contact roller 15 downwards in the direction of the body rail 1, the ramp 16 leads to an automatic movement of the contact rail 2 into the fully retracted position. In the example shown, the ramp 16 is formed integrally from the material of the body rail 1 in a punching and bending process. It has a length in the range of one to several cm and an inclination in the range of several degrees compared to the other course of the body rail 1.

When running rail 2 is retracted from an extended position of the pull-out guide, the contact roller 15 is sprung out due to the spring section 14. When the contact roller 15 approaches the body rail 1, force must therefore first be applied when retracting the body rail in order to bring the contact roller 15 with its running surface to the height of the lower horizontal section of the body rail 1. To facilitate this process, a further ramp 17 with an opposite gradient to that of ramp 16 is provided in the front section of body rail 1. After the contact roller 15 has been lifted with the aid of the further ramp 17 when the body rail 2 is retracted, the self-retracting mechanism sets in by rolling the contact roller 15 on the ramp 16. The retraction movement ends thereupon either by the contact roller stopping at an end stop 18, in this case designed as a projection of the punched-out section for the ramp 16, or by the front cover striking the opposite guide rail or by internal stops of the pull-out guide, for example via the rolling elements.

FIG. 4 shows a further embodiment example of a guide in an isometric general view, which also uses a contact roller 15 to electrically connect the body or running rail of the pull-out guide.

In contrast to the embodiment examples shown above, this pull-out guide has a cover 22 with a U-shaped cross-section which is slipped over the running rail. The sides of the cover 22 also cover the body rail and in particular a gap usually present between the running and body rail, thus shielding the rails of the pull-out guide from microwave radiation.

In contrast to the embodiment example in FIGS. 3a-3c, the contact roller 15 is located in the rear area of the pull-out guide in this case. It is arranged in a spring-mounted manner on the body rail, wherein the ramps 16, 17 are designed accordingly on the running rail. The cover 22 is recessed in the area of the ramps 16, 17.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 Body Rail
2 Running rail
21 Bolt
22 Cover
3 Middle rail
31 Contact roller
4 Rolling element cage
5 Rolling elements
10 End plug
11 Base body
12 Front cover
13 Contact rod
14 Spring section
15 Contact roller
16 Ramp
17 Ramp
18 End stop

The invention claimed is:

1. A pull-out guide for a microwave cooking appliance or an industrial oven, the pull-out guide comprising:
a body rail;
a running rail, which is moveable relative to the body rail and configured for depositing a carrier; and
means for electrically contacting the running rail with the body rail, wherein the means for electrical contacting comprise at least one contact roller rotatably mounted on the body rail and/or the running rail and contacts a respective other one of the body and running rails,
wherein the at least one contact roller is arranged in such a way that the at least one contact roller moves into the respective other one of the body and running rails when the pull-out guide is retracted,
wherein at least one ramp is arranged in an area of the respective other one of the body and running rails into which the at least one contact roller enters,
wherein the at least one contact roller is mounted resiliently, and
wherein the at least one contact roller is configured as a guard locking mechanism and/or a self-closing mechanism.

2. The pull-out guide of claim 1, wherein the pull-out guide is a full-extension pull-out guide having a middle rail, which is movable relative to the body rail and the running rail.

3. The pull-out guide of claim 2, wherein the means for electrical contact also electrically connect the running rail and/or the body rail to the middle rail.

4. The pull-out guide of claim 1, wherein the means for electrical contacting of the body rail and the running rail establish an electrical connection at least in one retracted position of the pull-out guide.

5. The pull-out guide of claim 1, wherein the at least one contact roller is also configured to implement aivar a stop function.

6. The pull-out guide of claim 1, wherein the at least one contact roller is mounted with play.

7. The pull-out guide of claim 1, wherein the at least one contact roller has an electrically conductive material, which is a metal, graphite, and/or an electrically conductive plastic.

8. The pull-out guide of claim 7, wherein the at least one contact element has a core, which is completely or partially surrounded by the electrically conductive material.

9. The pull-out guide of claim 8, wherein the electrically conductive material is a yielding material comprising a knitted or crocheted fabric of conductive threads.

10. The pull-out guide of claim 8, wherein the electrically conductive material is a yielding material comprising conductive brushes or bristles.

11. The pull-out guide of claim 8, wherein the electrically conductive material is a yielding material comprising an electrically conductive plastic.

12. The pull-out guide of claim 1 the at least one contact roller is configured in such a way that the at least one contact roller holds the pull-out guide in a retracted position by frictional and/or positive locking.

13. The pull-out guide of claim 1, wherein at least one front cover is formed or fixed to an end region of the body rail and/or the running rail, and wherein the at least one front cover is coated or covered with an electrically non-conductive material.

14. A microwave cooking appliance or industrial oven, comprising:
a body; and
a pull-out guide comprising
a body rail affixed to the body;
a running rail, which is moveable relative to the body rail and configured for depositing a carrier; and
means for electrically contacting the running rail with the body rail, wherein the means for electrical contacting comprise at least one contact roller rotatably mounted on the body rail and/or the running rail and contacts a respective other one of the body and running rails,
wherein the at least one contact roller is arranged in such a way that the at least one contact roller moves into the respective other one of the body and running rails when the pull-out guide is retracted,
wherein at least one ramp is arranged in an area of the respective other one of the body and running rails into which the at least one contact roller enters,
wherein the at least one contact roller is mounted resiliently, and
wherein the contact roller is configured as a guard locking mechanism or a self-closing mechanism.

* * * * *